(12) United States Patent
Witter et al.

(10) Patent No.: US 9,062,695 B2
(45) Date of Patent: Jun. 23, 2015

(54) CONNECTION MECHANISM

(71) Applicant: OTTER PRODUCTS, LLC, Fort Collins, CO (US)

(72) Inventors: Kevin W. Witter, Fort Collins, CO (US); John P. Fitzgerald, Fort Collins, CO (US); Jonathan Shea Robinson, Fort Collins, CO (US); Adam D. Center, Fort Collins, CO (US); Larry Holmes, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 37 days.

(21) Appl. No.: 14/078,436

(22) Filed: Nov. 12, 2013

(65) Prior Publication Data

US 2014/0077044 A1    Mar. 20, 2014

Related U.S. Application Data

(63) Continuation of application No. 13/466,301, filed on May 8, 2012, now Pat. No. 8,608,502.

(51) Int. Cl.

| F16B 1/00 | (2006.01) |
|---|---|
| H01R 13/62 | (2006.01) |
| H01R 24/38 | (2011.01) |
| F16L 37/00 | (2006.01) |
| F16M 13/02 | (2006.01) |
| F16B 5/06 | (2006.01) |
| F16B 21/12 | (2006.01) |
| H01F 7/02 | (2006.01) |

(52) U.S. Cl.
CPC .............. *F16B 1/00* (2013.01); *Y10T 403/598* (2015.01); *Y10T 24/32* (2015.01); *Y10T 403/18* (2015.01); *H01R 13/6205* (2013.01); *H01R 24/38* (2013.01); *F16L 37/004* (2013.01); *F16M 13/02* (2013.01); *F16B 5/0642* (2013.01); *F16B 21/12* (2013.01); *F16B 2001/0035* (2013.01); *H01F 7/0263* (2013.01)

(58) Field of Classification Search
CPC ..................... H01R 13/6205; H01R 13/625
USPC ............... 70/413; 248/309.4; 439/38, 39
See application file for complete search history.

(56) References Cited

U.S. PATENT DOCUMENTS

| 2,121,301 A | * | 6/1938 | Ractliffe | 70/276 |
| 2,851,670 A | * | 9/1958 | Senior | 439/825 |
| 3,143,384 A | * | 8/1964 | Senior, Jr. | 439/282 |
| 3,416,336 A | * | 12/1968 | Felson | 70/276 |
| 3,477,261 A | * | 11/1969 | Siana | 70/427 |
| 3,512,382 A | * | 5/1970 | Mauro et al. | 70/276 |
| 3,521,216 A | * | 7/1970 | Tolegian | 439/39 |
| 3,566,637 A | * | 3/1971 | Hallmann | 70/276 |

(Continued)

*Primary Examiner* — Ross Gushi

(57) ABSTRACT

A connection mechanism between two components may use one or more metallic pins that are magnetically extended when the components are engaged, and a sloped groove that retracts and unlocks the pins when the components are rotated. The components are locked in place by the pins during engagement. Disengagement may be performed by rotating the two components with respect to each other. The connection mechanism may include one or more magnets mounted on either or both components. The magnets may be arranged to attract the components when the components are in the locking orientation and to repel the components when the components are rotated to an unlocked position. The connection mechanism may include electrical connections between the components.

20 Claims, 3 Drawing Sheets

(56) References Cited

U.S. PATENT DOCUMENTS

| | | | |
|---|---|---|---|
| 3,584,484 A * | 6/1971 | Hallmann et al. | 70/276 |
| 3,689,866 A * | 9/1972 | Kelly | 439/586 |
| 3,782,147 A * | 1/1974 | Hallmann | 70/276 |
| 3,786,391 A * | 1/1974 | Mathauser | 439/39 |
| 3,808,577 A * | 4/1974 | Mathauser | 439/39 |
| 3,810,258 A * | 5/1974 | Mathauser | 439/39 |
| 3,816,679 A * | 6/1974 | Hotchkiss | 200/51.09 |
| 3,837,195 A * | 9/1974 | Pelto | 70/276 |
| 3,951,488 A * | 4/1976 | Hesse et al. | 439/94 |
| 4,285,220 A * | 8/1981 | Kajita | 70/276 |
| 4,398,404 A * | 8/1983 | Wake | 70/276 |
| 4,627,251 A * | 12/1986 | Bhate | 70/276 |
| 4,702,539 A * | 10/1987 | Cusick et al. | 439/588 |
| 4,845,593 A * | 7/1989 | Brown et al. | 361/192 |
| 4,895,530 A * | 1/1990 | Gugelmeyer et al. | 439/311 |
| 5,074,136 A * | 12/1991 | Kim et al. | 70/276 |
| 5,600,977 A * | 2/1997 | Piron | 70/57.1 |
| 5,685,730 A * | 11/1997 | Cameron et al. | 439/335 |
| 5,956,986 A * | 9/1999 | Vonlanthen | 70/492 |
| 5,996,954 A | 12/1999 | Rosen et al. | |
| 5,996,956 A | 12/1999 | Shawver | |
| 6,305,656 B1 | 10/2001 | Wemyss | |
| 6,352,443 B1 * | 3/2002 | Takahashi | 439/336 |
| 6,364,681 B1 * | 4/2002 | Watanabe | 439/335 |
| 6,367,297 B1 * | 4/2002 | Mottura | 70/276 |
| 6,409,531 B1 * | 6/2002 | Millard | 439/289 |
| 6,464,524 B1 * | 10/2002 | Kerr et al. | 439/313 |
| 6,481,254 B1 * | 11/2002 | Zheng et al. | 70/276 |
| 6,550,298 B1 * | 4/2003 | Su | 70/276 |
| 6,607,293 B2 * | 8/2003 | Suzuki et al. | 362/430 |
| 6,780,049 B1 * | 8/2004 | D'Angelo et al. | 439/537 |
| 6,966,781 B1 * | 11/2005 | Bullinger et al. | 439/38 |
| 7,056,127 B2 * | 6/2006 | Suzuki et al. | 439/39 |
| 7,077,681 B2 * | 7/2006 | Behoo | 439/333 |
| 7,158,376 B2 | 1/2007 | Richardson et al. | |
| 7,180,735 B2 | 2/2007 | Thomas et al. | |
| 7,217,059 B1 * | 5/2007 | Rudduck | 403/324 |
| 7,264,479 B1 * | 9/2007 | Lee | 439/39 |
| 7,287,738 B2 * | 10/2007 | Pitlor | 248/544 |
| 7,311,526 B2 | 12/2007 | Rohrbach et al. | |
| 7,445,452 B1 * | 11/2008 | Wu | 439/39 |
| 7,497,693 B1 * | 3/2009 | Wu | 439/39 |
| 7,498,546 B2 * | 3/2009 | Belongia et al. | 219/518 |
| 7,575,389 B2 * | 8/2009 | Nance | 403/109.2 |
| 7,621,161 B2 * | 11/2009 | Fontana et al. | 70/276 |
| 7,625,213 B1 * | 12/2009 | Tse | 439/39 |
| 7,628,632 B2 * | 12/2009 | Holland | 439/309 |
| 7,632,119 B1 * | 12/2009 | Ma et al. | 439/172 |
| 7,637,746 B2 * | 12/2009 | Lindberg et al. | 439/38 |
| 7,658,613 B1 * | 2/2010 | Griffin et al. | 439/39 |
| 7,726,999 B2 * | 6/2010 | Vanzo | 439/333 |
| 7,740,499 B1 * | 6/2010 | Willey et al. | 439/332 |
| 7,927,154 B2 * | 4/2011 | Sekela et al. | 439/699.2 |
| 7,930,004 B2 | 4/2011 | Seil et al. | |
| 8,040,032 B2 * | 10/2011 | Kovacs | 313/318.01 |
| RE42,926 E * | 11/2011 | Norwood et al. | 439/314 |
| 8,608,502 B2 * | 12/2013 | Witter et al. | 439/335 |
| 8,863,563 B2 * | 10/2014 | Gentile et al. | 70/276 |
| 8,912,904 B2 * | 12/2014 | Ho | 340/572.1 |
| 8,944,826 B1 * | 2/2015 | Wilkolaski et al. | 439/39 |
| 2002/0086559 A1 * | 7/2002 | Ferrerfabrega et al. | 439/39 |
| 2003/0013338 A1 * | 1/2003 | Birkenmaier et al. | 439/332 |
| 2004/0029405 A1 * | 2/2004 | Neidlein | 439/38 |
| 2006/0086873 A1 * | 4/2006 | Chen | 248/206.5 |
| 2006/0231713 A1 | 10/2006 | Crain et al. | |
| 2007/0113605 A1 * | 5/2007 | Lopez | 70/276 |
| 2008/0139005 A1 * | 6/2008 | Guo et al. | 439/39 |
| 2008/0305649 A1 * | 12/2008 | Didur et al. | 439/39 |
| 2009/0239392 A1 * | 9/2009 | Sumitomo et al. | 439/39 |
| 2011/0073608 A1 | 3/2011 | Richardson et al. | |

* cited by examiner

CONNECTION MECHANISM

CROSS REFERENCE TO RELATED APPLICATIONS

This application is a continuation of U.S. patent application Ser. No. 13/466,301 entitled "Connection Mechanism", filed May 8, 2012. The entire contents of the above mentioned application are hereby specifically incorporated by reference in their entirety.

BACKGROUND

Portable electronic devices are ubiquitous. For example, Global Positioning System (GPS) receivers and mapping devices are found as standalone devices or incorporated into mobile telephones or other devices. Many people carry tablet or slate computers for accessing the Internet or for running various applications.

In many cases, users of these devices carry the devices in their pockets, but there are many instances where a user may wish to attach the device to a dashboard in a car, handlebars of a bicycle, a golf cart, or any other application.

SUMMARY

A connection mechanism between two components may use one or more metallic pins that are magnetically extended when the components are engaged, and a sloped groove that retracts and unlocks the pins when the components are rotated. The components are locked in place by the pins during engagement. Disengagement may be performed by rotating the two components with respect to each other. The connection mechanism may include one or more magnets mounted on either or both components. The magnets may be arranged to attract the components when the components are in the locking orientation and to repel the components when the components are rotated to an unlocked position. The connection mechanism may include electrical connections between the components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A connection mechanism or coupler may use metallic pins that are normally retracted into a first component, but may extend into a slot in a second component by magnetic attraction. The slot may be configured so that when the components may be rotated with respect to each other, the pin may be moved back to its refracted position. When retracted, the components may be separated, but when the pin is engaged in the slot, the components may be held together.

The components may engage each other in different sequences. In one sequence, the components may be mated but may be rotated with respect to each other, such that the pin or pins do not align with the slot. As the components are rotated to the locking position, the pins may extend. The components may be unlocked by rotating the components with respect to each other.

In a second sequence, the components may be mated such that the pin or pins are aligned with the slots. As the components are mated, the pins may be extended and the components may be locked in place. As with the previous sequence, the components may be unlocked by rotating the components with respect to each other.

Some embodiments may include one or more engagement magnets that may attract the components together. In some such embodiments, the engagement magnets may be arrayed such that they attract the components in a locked position but repel the components in an unlocked position. Such embodiments may give a user a tactile feedback when the components are unlocked and locked.

The connection mechanism may mechanically lock the components together, but may be readily separated by rotating the components. In the locked position, the connection mechanism may transmit forces from one component to the other component.

In some embodiments, the components may also include various connections, such as electrical connections, air or gas connections, liquid connections, or other connections. With access flow or integration points between the components, such embodiments may be useful for connecting various electrical signals, hoses, pipes, or other conduits in an easy to install and easy to remove system.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
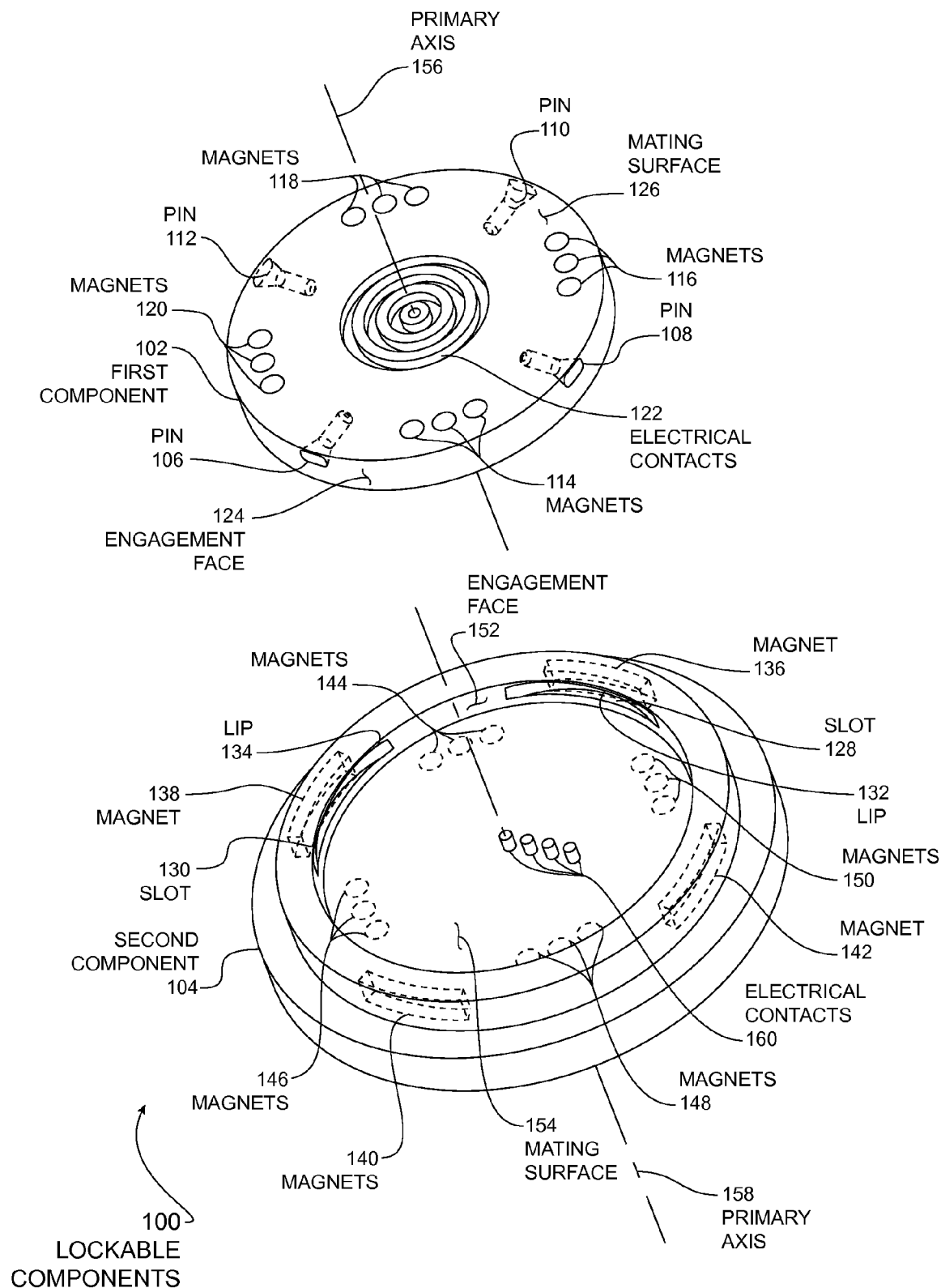
FIG. 1 is a diagram illustration of an embodiment showing two connection components.

FIG. 1 is a schematic illustration of an embodiment 100 showing a first and second component. FIG. 1 is not to scale. Embodiment 100 illustrates an example of a mating pair of components oriented so that the mating surfaces are shown.

Embodiment 100 illustrates a first component 102 and second component 104 oriented to view the mating surfaces 126 and 154. When the first component 102 is engaged to the second component 104, the first component 102 may be flipped over such that the mating surfaces 126 and 154 are touching each other.

Embodiment 100 illustrates an example of a mating pair of components that may be locked in one of four positions. Each of the four locking positions may be 90 degrees from the next. Other embodiments may have one, two, three, four, five, six, or more locking positions.

The first component 102 has a set of pins 106, 108, 110, and 112 that may correspond to the slots 128 and 130 of the second component. The second component may have additional slots that are not shown. The slots 128 and 130 may form lips 132 and 134. When the first component 102 is engaged to the second component 104, the various pins may extend into the slots of the second component 104, thereby locking the two components together.

The pins on the first component 102 may be drawn into the slots of the second component 104 by magnets 136, 138, 140, and 142 that may be positioned near the slots. As the two components are engaged, the magnets 136, 138, 140, and 142 may magnetically attract the pins from their retracted position and into an extended position. In the extended position, the pins may extend into the slots and the first component 102 may be locked to the second component 104. The magnets 136, 138, 140, and 142 may be located inside the second component 104 but near the various slots.

The slots may be constructed so that when the first component 102 is rotated with respect to the second component 104, the pins may be forced back into the refracted position. When in the retracted position, the two components may be separated from each other.

Embodiment 100 shows locking positions that may be equally positioned around the primary axes 156 and 158. Embodiment 100 further illustrates an embodiment where each pin may be engaged into a corresponding slot in the mating component. Other embodiments may have the various pins and slots located such that one or more of the locking positions may not engage all of the various pins and slots.

In one such type of embodiment, the second component 104 may have more slots than the first component has pins. In another type, the first component 102 may have more pins than the second component 104 has slots. In still another type, the orientation and position of the various pins and slots may be such that not all of the pins may be engaged into slots in a locking position.

The various pins 106, 108, 110, and 112 are illustrated as rectangular bars. The pins may be formed in many different shapes and move in various manners in other embodiments. For example, the pins may have a circular, square, or other shaped cross-section.

In the example of embodiment 100, the pins may move linearly. Other embodiments may use pins that rotate about a hinge point or slide in a curved fashion.

Embodiment 100 shows pins that move in a channel or hole that is perpendicular to the primary axis 156. Other embodiments may have a similar channel or hole, but that channel or hole may not be perpendicular to the primary axis 156.

The first component 102 has an engagement face 124 that is circular in shape which is a revolved surface about the primary axis 156. The engagement face 124 may fit against the engagement face 152 of the second component 104 when the two components are mated. The engagement face 152 of the second component 104 may be a revolved surface about the primary axis 158.

The engagement face 124 of the first component 102 may be slightly smaller in diameter than the engagement face 152 of the second component 104. The difference in diameters may vary with different embodiments. In some embodiments, the diameter difference may be on the order of a slip fit, which may be 0.005 in to 0.020 in in some cases. Some embodiments may have a diameter difference of 0.020 in to 0.050 in or larger.

The engagement faces 124 and 152 are illustrated as being complete circles. With the arrangement of the pins and slots, embodiment 100 is an example embodiment where the two components 102 and 104 may be rotated 360 degrees with respect to each other.

In some embodiments, the engagement faces 124 and 152 may be sectors of circles and the embodiments may permit the components to rotate only a limited arc with respect to each other. Such embodiments may permit only one, two, three, four, or more locking positions, but may not allow the components to rotate more than the limited arc when the mating surface 126 of the first component 102 is in contact with the mating surface 154 of the second component.

The two components 102 and 104 are illustrated as being outfitted with some engagement magnets. The first component 102 is illustrated as having magnets 114, 116, 118 and 120, while the second component 104 is illustrated as having magnets 144, 146, 148, and 150. The engagement magnets may be exposed or located below the surface of the various components.

The various engagement magnets may draw the two components together when the components are in a locked position. The polarity of the magnets may be selected so that when the components are rotated to an unlocked position, the engagement magnets may repel each other, causing the components to repel.

The engagement magnets are illustrated as being placed in groups of three. In such an arrangement, the center magnet may have a different polarity than the two other magnets. The corresponding set of magnets on the opposite component may be arranged similarly, but so that the sets of magnets attract when the components are in the locking position.

The position and arrangement of the engagement magnets in embodiment 100 is merely one example of many different placements of engagement magnets. Embodiment 100 illustrates the engagement magnets within the periphery of the engagement faces, but other embodiments may have engagement magnets located outside of the radius of the engagement faces.

Embodiment 100 further illustrates an example embodiment where electrical connections may be made when the two components are engaged. The first component 102 may have several concentric electrical contacts 122 that may mate with the electrical contacts 160 of the second component 104.

The electrical contacts 160 may be spring loaded contacts that may slide along the concentric electrical contacts 122 when a user couples and decouples the components. Other embodiments may have other connections, such as hose connections that may pass gasses or liquids through the components. Such hose connections may be passed through the center of the components along the primary axis is some embodiments. Some embodiments may pass light, including laser light, through the components.

Figure 2A:
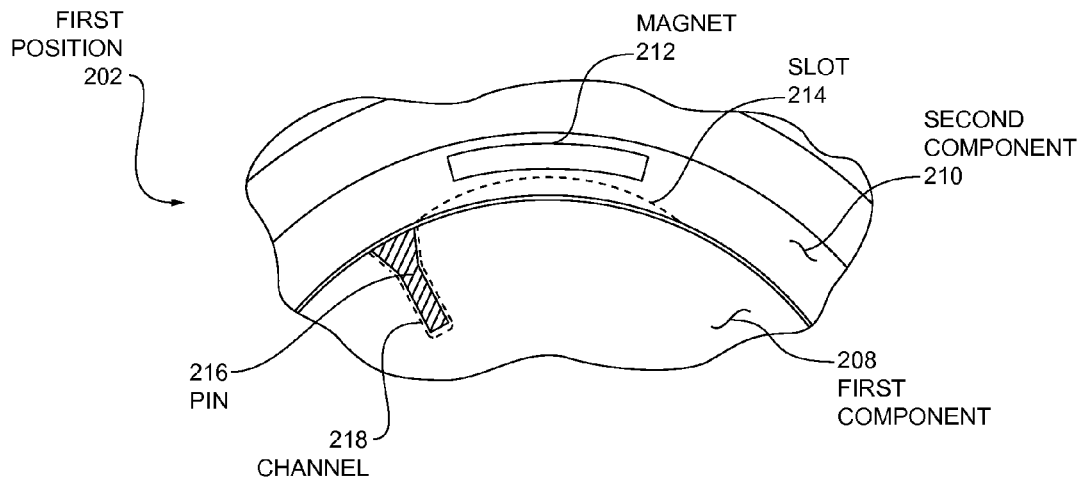
FIG. 2A is a schematic illustration of a pair of connection components in a first position.
Figure 2B:
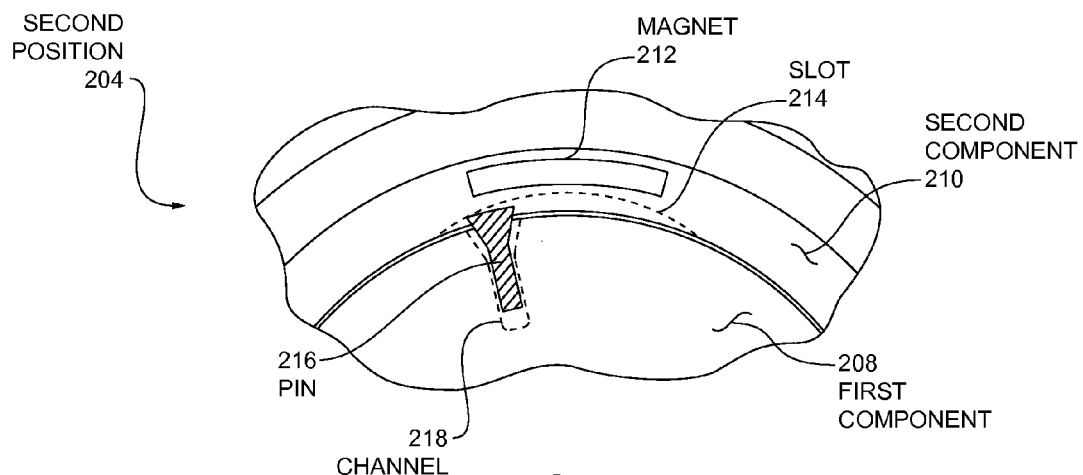
FIG. 2B is a schematic illustration of a pair of connection components in a second position.
Figure 2C:
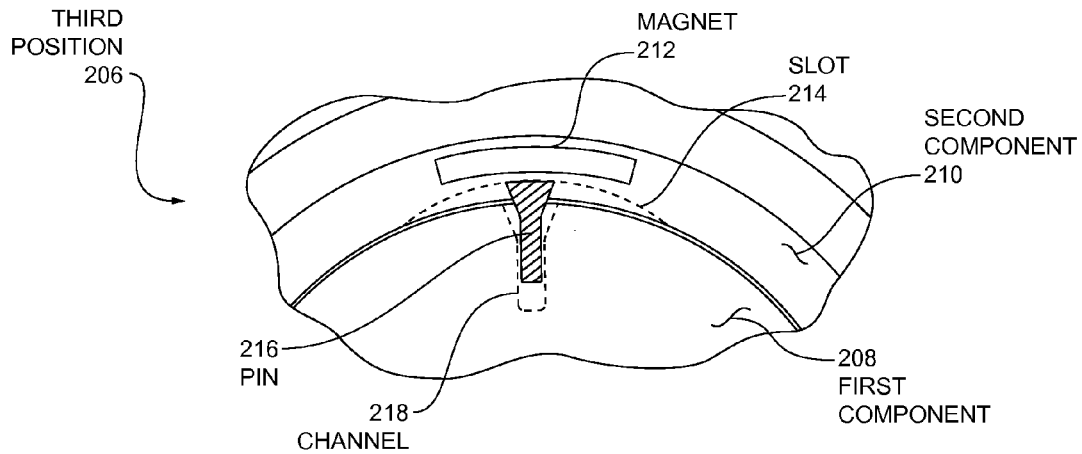
FIG. 2C is a schematic illustration of a pair of connection components in a third position.

FIGS. 2A, 2B, and 2C illustrate embodiments 202, 204, and 206 showing three different positions of a first component 208 and a second component 210. Embodiments 202, 204, and 206 are schematic illustrations of how the components move from an unlocked position to a locked position and are not to scale.

Embodiment 202 illustrates the components in an unlocked position. Embodiment 206 illustrates the components in a locked position, and embodiment 204 shows the components in between locked and unlocked.

The locking sequence may be seen by viewing the embodiments in order from top to bottom. The unlocking sequence operates in reverse.

In the first position shown in embodiment 202, the first component 208 is rotated with respect to the second component 210 such that the pin 216 is illustrated as being away from the slot 214. The pin 216 is illustrated in a retracted position within the channel 218.

As the first component 208 is rotated as shown in embodiment 204, the magnetic attraction of the magnet 212 may draw the pin 216 out of the channel 218 and into the slot 214.

When the first component 208 reaches a locked position as shown in embodiment 206, the pin 216 may be fully extended into the slot 214. The pin 216 may be extended to the locking position by the magnetic attraction provided by the magnet 212. When in the locked position, the pin may engage a lip formed by the slot and thereby mechanically restrict the components from being pulled apart.

In many devices, a set of engagement magnets (not shown) may help hold the two components in the locked position.

In order to unlock the components, the first component 208 may be rotated to the position shown in embodiment 204. As the first component 208 is rotated, the slot 214 may force the pin 216 to retract into the channel 218.

As the unlocking process continues, the first component 208 may be further rotated to the position shown in embodiment 202. As the first component 208 is further rotated, the slot 214 may force the pin 216 further into the channel 218 and into a refracted position.

Figure 3:
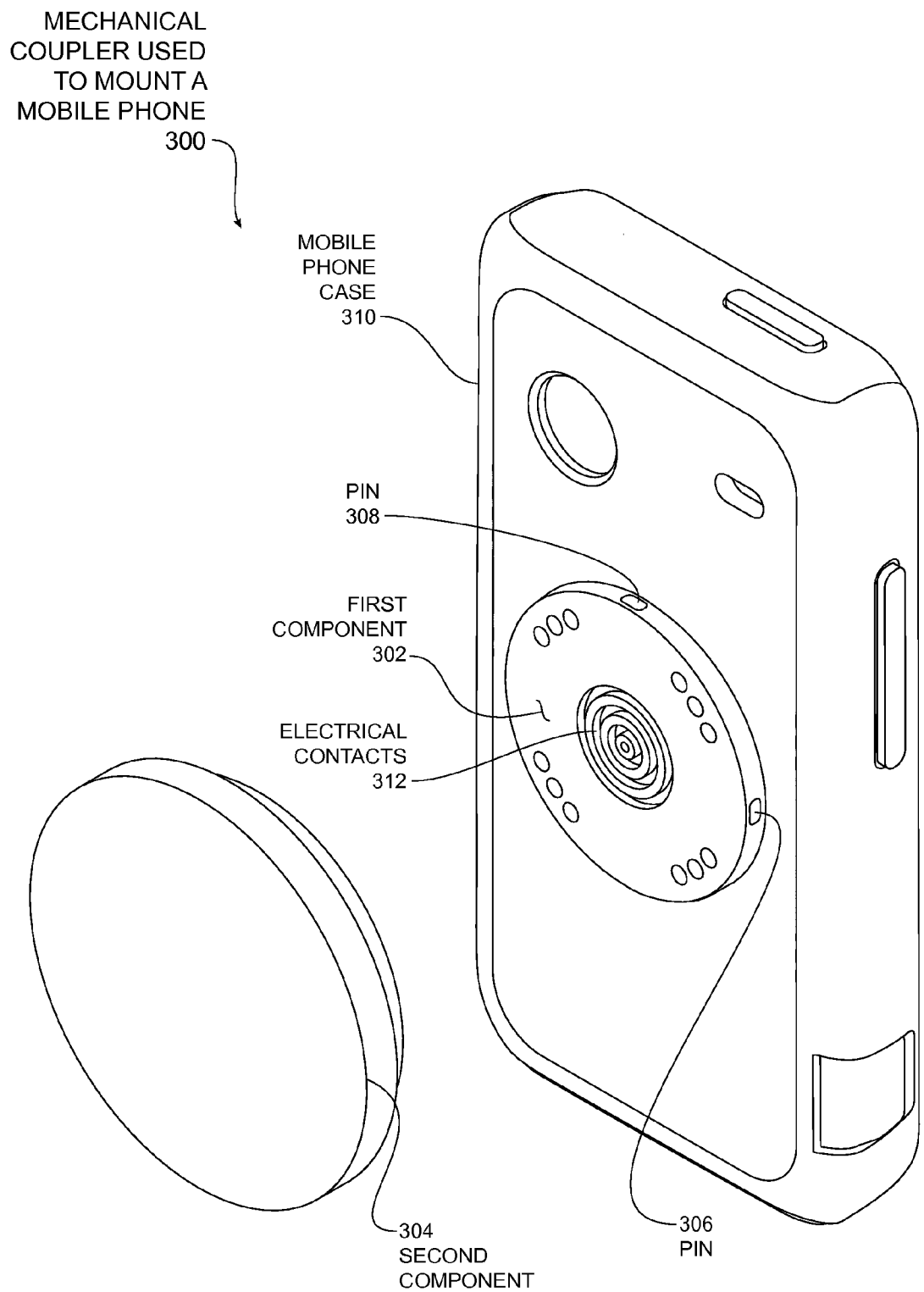
FIG. 3 is a diagram illustration of an embodiment showing the connection components being used for mounting a mobile telephone.

FIG. 3 is an illustration of an embodiment 300 showing a mechanical coupler used to mount a mobile phone. FIG. 3 is not to scale.

The mechanical coupler may be used in many different applications. In merely one example of such a use, the coupler may be used to mount a mobile telephone to a holder. The holder may be, for example, mounted on a bicycle handlebar, automobile dashboard, or some other location. The mobile telephone may be mounted in a removable case that includes the mating coupler component so that the mobile telephone may be quickly mounted and removed.

In the example of embodiment 300, the first component 302 may be mounted to a mobile phone case 310. The second component 304 may be mounted to a stand or other mechanism.

The first component 302 is illustrated with pins 306 and 308, as well as electrical contacts 312. Embodiment 300 may provide electrical power and signal connections between the stand (not shown) to which the second component 304 is attached, to the mobile phone held in the case 310.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A connection mechanism comprising:
   a first component adapted to mechanically lock to a second component when the connection mechanism is in a locked position, the first component comprising one or more pins, the one or more pins being magnetically attractive, wherein the one or more pins are adapted to extend from the first component when the connection mechanism is in the locked position, and wherein the one or more pins are adapted to retract into the first component when the connection mechanism is in an unlocked position;
   the second component comprising an engagement face and one or more slots disposed in the engagement face, the one or more slots comprising a first slot, the second component further comprising a first magnet positioned near the first slot, wherein the first magnet is adapted to magnetically attract a first pin of the one or more pins thereby causing the first pin to extend into the first slot as the connection mechanism transitions from the unlocked position to the locked position, wherein the first pin extended into the first slot mechanically resists the first component from being separated from the second component when the connection mechanism is in the locked position.

2. The connection mechanism of claim 1, wherein the second component further comprises a lip formed by the first slot, wherein the lip engages the first pin and mechanically restricts the first component and the second component from being pulled apart when the connection mechanism is in the locked position.

3. The connection mechanism of claim 1, wherein the first slot comprises a sloped groove that forces the first pin to retract into the first component when the connection mechanism transitions from the locked position to the unlocked position as the first component is rotated relative to a primary axis of the second component.

4. The connection mechanism of claim 1 further comprising an electrical connection between the first component and the second component when the connection mechanism is in a locked position, wherein the electrical connection is provided by a first electrical contact on the first component mating with a second electrical contact on the second component.

5. The connection mechanism of claim 4, wherein the first electrical contact comprises a plurality of concentric electrical contacts proximate a first mating surface of the first component, wherein the second electrical contact comprises a plurality of spring loaded electrical contacts proximate a second mating surface of the second component, wherein the plurality of spring loaded contacts are adapted to slide along the plurality of concentric electrical contacts as the first component is rotated relative to the primary axis of the second component.

6. The connection mechanism of claim 1, wherein the first component further comprises a first plurality of magnets proximate a first mating surface, wherein the second component further comprises a second plurality of magnets proximate a second mating surface, wherein the first plurality of magnets in the first component are adapted to attract the second plurality of magnets and thereby draw the first mating surface of the first component against the second mating surface of the second component when the connection mechanism is in the locked position, and wherein the first plurality of magnets is adapted to repel the second plurality of magnets and thereby repel the first mating surface of the first component from the second mating surface of the second component when the connection mechanism is rotated from the locked position to the unlocked position.

7. The connection mechanism of claim 1, wherein the connection mechanism is adapted to pass a gas or a liquid between the first component and the second component when the connection mechanism is in the locked position.

8. The connection mechanism of claim 1, wherein the connection mechanism is adapted to pass light between the first component and the second component when the connection mechanism is in the locked position.

9. The connection mechanism of claim 1, wherein the first component comprises a first engagement face, the first engagement face comprising a cylindrical surface having a centerline that is aligned with a primary axis of the first component, the first pin being disposed in a first hole in the first component, the first hole arranged perpendicular to the primary axis of the first component.

10. A mechanical coupler for mounting a mobile phone, the mechanical coupler comprising:
   a first component adapted to mechanically lock to a second component when the mechanical coupler is in a locked position, the first component comprising one or more pins, the one or more pins being magnetically attractive, wherein the one or more pins are adapted to extend from the first component when the mechanical coupler is in the locked position, and wherein the one or more pins are adapted to retract into the first component when the mechanical coupler is in an unlocked position;
   the second component comprising an engagement face and one or more slots disposed in the engagement face, the one or more slots comprising a first slot, the second component further comprising a first magnet positioned near the first slot, wherein the first magnet is adapted to magnetically attract a first pin of the one or more pins thereby causing the first pin to extend into the first slot as the mechanical coupler transitions from the unlocked position to the locked position, wherein the first pin extended into the first slot mechanically resists the first component from being separated from the second component when the mechanical coupler is in the locked position.

11. The mechanical coupler of claim 10, wherein the first component is mounted to a mobile phone case, the mobile phone case being adapted to receive a mobile phone.

12. The mechanical coupler of claim 11, wherein the second component is mounted to a stand.

13. The mechanical coupler of claim 12, wherein the mechanical coupler provides an electrical power connection between the first component and the second component.

14. The mechanical coupler of claim 12, wherein the mechanical coupler provides an electrical signal connection between the first component and the second component.

15. The mechanical coupler of claim 10, wherein the mechanical coupler is adapted to mount a mobile phone to a holder.

16. The mechanical coupler of claim 15, wherein the holder is adapted to mount to a bicycle handlebar.

17. The mechanical coupler of claim 15, wherein the holder is adapted to mount to an automotive dashboard.

18. A connection mechanism for providing electrical power to a mobile phone, the connection mechanism comprising:
   a first component adapted to mechanically lock to a second component when the connection mechanism is in a locked position, the first component comprising one or more pins, wherein the one or more pins are adapted to extend from the first component when the connection mechanism is in the locked position, and wherein the one or more pins are adapted to retract into the first component when the connection mechanism is in an unlocked position;
   the second component comprising an engagement face and one or more slots disposed in the engagement face, the one or more slots comprising a first slot, the second component further comprising a first magnet positioned near the first slot, wherein the first magnet is adapted to magnetically attract a first pin of the one or more pins thereby causing the first pin to extend into the first slot as the connection mechanism transitions from the unlocked position to the locked position, wherein the first pin extended into the first slot mechanically resists the first component from being separated from the second component when the connection mechanism is in the locked position,
   wherein an electrical connection is provided between the first component and the second component when the connection mechanism is in the locked position, wherein the electrical connection is provided by a first electrical contact on the first component mating with a second electrical contact on the second component when the connection mechanism in in the locked position.

19. The connection mechanism of claim 18, wherein the electrical connection provides an electrical power connection between the first component and the second component.

20. The connection mechanism of claim 18, wherein the electrical connection provides an electrical signal connection between the first component and the second component.

* * * * *